United States Patent [19]

Rzepecki et al.

[11] 4,414,260

[45] * Nov. 8, 1983

[54] STATIC DISSIPATIVE UPHOLSTERY FABRIC OR THE LIKE

[75] Inventors: Ray M. Rzepecki, North Scituate, R.I.; Victor H. Weiss, Bridgeport, Conn.

[73] Assignee: Pervel Industries, Inc., Plainfield, Conn.

[ * ] Notice: The portion of the term of this patent subsequent to Dec. 7, 1999 has been disclaimed.

[21] Appl. No.: 409,599

[22] Filed: Aug. 19, 1982

Related U.S. Application Data

[63] Continuation-in-part of Ser. No. 243,776, Mar. 16, 1981, Pat. No. 4,363,071.

[51] Int. Cl.$^3$ ...................... B32B 27/06; B32B 27/18; B32B 27/30

[52] U.S. Cl. .................................. 428/212; 428/240; 428/242; 428/244; 428/248; 428/252; 428/323; 428/507; 428/520; 428/922

[58] Field of Search .............. 428/520, 507, 212, 240, 428/242, 244, 248, 252, 323, 922

[56] References Cited

U.S. PATENT DOCUMENTS 4,301,040 11/1981 Berbeco .............................. 428/311
4,307,144 12/1981 Sanders et al. ...................... 428/922

FOREIGN PATENT DOCUMENTS 56-26157 10/1981 Japan .................................. 428/922

*Primary Examiner*—James C. Cannon
*Attorney, Agent, or Firm*—Hopgood, Calimafde, Kalil, Blaustein & Judlowe

[57] ABSTRACT

The invention contemplates a multi-layer electrically conductive web for safely and quickly discharging personnel-accumulated static electricity, and suitable as an upholstery material. The web comprises an upper continuous polymeric layer of relatively low conductivity, in the order of $10^8$ ohms per square, bonded to an underlying continuous polymeric layer of much greater conductivity, in the order of $10^2$ ohms per square, and provision is made for electrically grounding the underlying layer, illustratively by casting to the intermediate layer a continuous bottom layer of expanded polymeric material of relatively low conductivity. In the preferred embodiment, a fabric base is laminated to the bottom layer of the web.

8 Claims, 10 Drawing Figures

TOP CONTINUOUS VINYL LAYER (HIGH VOLUME RESISTIVITY)
10
CONDUCTIVE INNER LAYER (LOW SURFACE RESISTANCE)
11
NON-SKID CONDUCTIVE VINYL BACKING (HIGH VOLUME RESISTIVITY)
12
13
FABRIC BASE

TOP CONTINUOUS VINYL LAYER (HIGH VOLUME RESISTIVITY)

CONDUCTIVE INNER LAYER (LOW SURFACE RESISTANCE)

NON-SKID CONDUCTIVE VINYL BACKING (HIGH VOLUME RESISTIVITY)

FABRIC BASE

FIG. 3a. EMBOSSED CASTING PAPER (WITH RELEASE COAT)

FIG. 3b. TOP LAYER CAST AND FUSE

FIG. 3c. INNER LAYER LAMINATE

FIG. 3d. BOTTOM LAYER CAST

FIG. 3e. BOTTOM LAYER EXPAND AND FUSE

FIG. 3f. WEB REMOVED FROM CASTING PAPER

FIG. 3g. WEB LAMINATED TO FABRIC

FIG. 4.

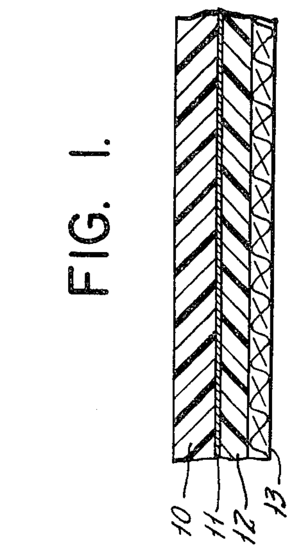

STATIC DISSIPATIVE UPHOLSTERY FABRIC OR THE LIKE

RELATED CASE

This application is a continuatin-in-part of copending application Ser. No. 243,776, filed Mar. 16, 1981, now U.S. Pat. No. 4,363,071.

BACKGROUND OF THE INVENTION

The invention relates to a flexible multi-layer static-dissipative web construction, suitable for example as an upholstery material or the like, to enable personnel-accumulated static electricity to safely discharge from a person seated upon or leaning against an upholstered stool or other furniture or appliance.

Various static-discharge mat constructions have been proposed, ranging from such highly conductive configurations as to permit the hazard of substantially instantaneous discharge, to slow-leaking constructions which exhibit undesirable dependence upon ambient humidity. Between these extremes, U.S. Pat. No. 4,208,696 to Lindsay, et al. describes a multi-layer static-dissipative web wherein an open-weave fabric in the form of cotton scrim is rendered electrically conductive (using carbon in a latex binder) and is interposed between upper and lower layers of relatively low conductivity, to produce mat constructions having an overall volume resistivity between $10^{10}$ and $10^{11}$ ohm-cm and surface resistance in the order of $10^8$ ohms per square; Lindsay, et al. predicate their results on the foraminous nature of their conductive open-weave fabric. While the Lindsay, et al. product is in many respects satisfactory, it is prone to delamination, and for many applications an order of magnitude reduction in surface resistance is desirable, i.e., to the order of $10^7$ ohms per square.

BRIEF STATEMENT OF THE INVENTION

It is an object of the invention to provide an improved static-dissipative web or upholstery of the character indicated.

It is a specific object to produce such a web or upholstery fabric that is inherently not prone to be delamination and which exhibits a surface resistance in the order of $10^7$ ohms per square, as measured pursuant to ASTM Standard D257-76.

A general object is to provide such a web or upholstery construction which is of relative simplicity, which uses readily controllable and available component materials, and which is inherently relatively insensitive to environmental humidity.

The invention achieves the foregoing objects by employing a thin continuous film of graphite-compounded polymeric material such as a bonded conductive flexible plate on the underside of the upper polymeric layer of low conductivity, the thin film having a surface resistance in the order of $10^2$ ohms per square, as measured pursuant to said ASTM Standard D257-76. By employing polymeric material of the same nature, e.g., polyvinyl chloride in both these layers, as well as in an expanded conductive cushioning bottom layer, laminar bonding is optimized, and sensitivity to varying humidity is minimized; a base ply of fabric on the bottom layer completes the preferred construction, although the fabric base may be omitted for certain applications. The continuous nature of all polymeric layers, and the continuous nature of their interface bonding, provides a continuous volume within which electrostatic charge may dissipate and distribute over the thin film of the conductive intermediate layer, as distinguished from the discrete paths in which charge dissipation must be channeled in the foraminous-scrim network configuration of Lindsay, et al. Ultimate grounding is via the conductivity of the metal furniture or appliance to which the upholstery fabric is applied.

DETAILED DESCRIPTION

The invention will be described in detail for a preferred embodiment, in conjunction with the accompanying drawings, in which:

FIG. 1 is an enlarged sectional view through an upholstery fabric element or construction of the invention;

FIG. 2 is an exploded view in perspective, to permit better identification of components of the construction of FIG. 1;

FIGS. 3*a* to 3*g* are views similar to FIG. 1, to illustrate successive stages in fabrication of the construction of FIG. 1; and FIG. 4 is a schematic diagram to illustrate steps in a continuous process for performing web-producing steps of FIG. 3.

In FIGS. 1 and 2, the invention is shown in the form of a static-dissipating web comprising three bonded layers 10-11-12 of differently conductive polymeric material, such as polyvinyl chloride, and a base fabric layer 13. The top or upper layer 10 and the lower bonded layer 12 may each be of the same solid-cast construction, but as shown, the lower layer 12 is an expanded version of the same polymeric material; and both layers 10–12 incorporate one or more conductive ingredients to enable each of layers 10–12 to have a volume resistivity in the range $10^7$ to $10^{12}$ ohm-cm. The inner or intermediate layer 11 is a thin film of preferably the same polymeric material containing an electrically conductive ingredient such as carbon black and exhibiting a surface resistance in the order of $10^2$ ohms per square, as measured pursuant to ASTM Standard D257-76. A highly satisfactory conductive vinyl film for use at conductive layer 11 is known as Condulon, a trademark and product of Pervel Industries, Inc., Plainfield, Conn.

In a specific illustrative example, the solid upper and expanded lower layers 10–12 are both of polyvinyl chloride, with added conductive plasticizer, which may be commercially available products known as Markstat AL-15 or di-octyl-adipate (DOA)*, or a combination of the two. If mixed, it is preferred that the proportion by weight of the AL-15 to the DOA be 2:1, their combination accounting for 12 percent of the total dry-ingredient mix. In the illustrative example, the solid top layer 10 was about 7 mils thick, the inner layer 11 was 2 mils thick, and the expanded lower layer was about 40 mils thick, for an overall thickness of about 50 mils (i.e., without the fabric 13, which accounted for an additional 3 mils). The upper and lower layers each exhibited a volume resistivity of about $10^9$ ohm-cm and a surface resistance of $10^8$ ohms per square, and the surface resistivity of the intermediate layer was 300 ohms per square. Overall surface resistance of the consolidated web was measured at the exposed surface of top layer 10 to be $10^7$ ohms per square, and the time for discharge of a 5 kV potential was 0.05 second, for a decay to ten percent of the original charge, per Federal Test Method Standard No. 101B, Method 4046.

*Markstat AL-15 is a product of Argus Division, Witco Chemical Company, Brooklyn, N.Y.; and DOA is available from various sources, including Monsanto, St. Louis, Mo.

Continuous manufacture of the described web will be described in connection with FIGS. 3 and 4, commencing with a supply reel 15 of suitable casting web 16 continuously advancing from left to right, in the sense of FIG. 4. The casting web 16 may be a release-coated fabric or paper, and in the latter event the casting surface thereof is preferably embossed (as in FIG. 3*a*), for ultimate aesthetic purposes at the exposed upper surface of layer 10.

A first casting of liquid-mixed polymeric-coat ingredients is made at 17 and the same is cured or fused at 18, thereby establishing the solid layer 10 atop the casting paper 16, as shown in FIG. 3*b*. A separate supply of conductive film for inner layer 11 is available from a reel 19 and is guided for bonded lamination to layer 10, under heat and pressure, at heated squeeze rolls 20, to produce intermediate product shown in FIG. 3*c*. A second casting of liquid-mixed polymeric-coat ingredients (this time with an expanding component) is then made at 21, so that the developing product appears as in FIG. 3*d*, wherein the numeral 12' will be understood to designate the as-yet unexpanded liquid coat applied at 17. Passage through an expanding oven 22 enables controlled uniform expansion of the coat 12' to its ultimate thickness, as bottom layer 12, the same being consolidated in a fusing oven 23, with the appearance shown in FIG. 3*e*. The bonded web is now completed by stripped removal of the casting paper and its separate accumulation at 24, leaving finished bonded-web product (FIG. 3*f*) available for reel accumulation at 25.

The fabric base 13 may be an add-on fabric, i.e., added by conventional lamination (FIG. 3*g*) to the layer 12 of the bonded web of FIG. 3*f*. The fabric base 13 need not be treated for enhanced conductive properties, because in use of the upholstery material of FIG. 1, it will have been applied to metal furniture or other structure providing adequate edge or other fastening contact to one or more of the layers 10–11–12 for assurance of ample charge dissipation to ground.

In an alternative technique, the described components 10–11–12 may be formed in inverse order by initial casting of layer 12 on the fabric base 13. However, this is a more expensive procedure and unnecessary to improve upon the properties obtained by merely laminating the web of FIG. 3*f*, via layer 12, to the fabric base 13.

Static-dissipating vinyl web material, produced as described is found to meet all stated objects. Static-dissipating conductivity is an order of magnitude (i.e., 10 times) better, that is, a surface resistance of $10^7$ ohms per square, as compared with $10^8$ ohms per square of a vinyl product of the Lindsay et al. patent, and delamination is virtually impossible. Ambient humidity and/or water immersion are found to have no significant effect on electrical properties. The inherent capability of Condulon to discharge a 5 kV charge in 0.02 second enables design modification to increase the speed of electrostatic discharge, from the 0.05 second time observed for the described mat, either by creating a less-thick top layer 10 or by increasing the proportion of conductive plasticizer in the low-conductivity layers 10–12. Generally, the thickness range of layer 10 may be between 3 and 10 mils, the thickness range of layer 11 may be between 1 and 5 mils, and the thickness range of layer 12 may be between 25 and 50 mils, expansion being optional and dependent upon ultimate use. The fabric base 13 may be woven or non-woven, of cotton or synthetic or a blend, and of thickness between 1 and 5 mils; and in the specific example above the fabric was so-called 4.23 poly-rayon, of 3-mils thickness.

While the invention has been described in detail for the preferred embodiment, it will be understood that modifications may be made without departing from the scope of the invention.

What is claimed is:

1. As an article of manufacture, for lamination to a fabric base in the manufacture of static-dissipative upholstery material or the like, a multi-layer conductive web for dissipating a static electric charge impressed thereon, said web comprising an upper layer of thermoplastic polymeric material having a volume resistivity of $1\times10^7$ to $1\times10^{12}$ ohm-cm, a continuous thin conductive film of thermoplastic polymeric material in direct physical and electrical connection with the underside of said upper layer and having a surface resistance in the order of $10^2$ ohms per square, and a conductive underlying lower layer in electrical contact with the underside of said conductive film, said underlying layer being a layer of expanded thermoplastic polymeric material having a volume resistivity of $1\times10^7$ to $1\times10^{12}$ ohm-cm.

2. An upholstery fabric or the like, comprising a base fabric and the article of claim 1 laminated thereto via said underlying layer.

3. An upholstery fabric or the like, comprising a base fabric, a lower conductive layer comprising expanded thermoplastic polymeric material bonded to said fabric and having a volume resistivity of $1\times10^7$ to $1\times10^{12}$ ohm-cm, a continuous thin film of conductive thermoplastic polymeric material having a surface resistance in the order of $10^2$ ohms per square and bonded in direct physical and electrical contact with said lower layer, and an upper layer of thermoplastic polymeric material having a volume resistivity of $1\times10^7$ to $1\times10^{12}$ ohm-cm and bonded in direct physical and electrical contact with said thin film.

4. As an article of manufacture, a multi-layer static-dissipating upholstery material or the like, comprising an upper layer of solid electrically conductive plasticized polyvinyl chloride having a volume resistivity of $10^7$ to $10^{12}$ ohm-cm, an intermediate layer of thin continuous solid electrically conductive plasticized polyvinyl chloride having a surface resistance in the order of $10^2$ ohms per square, and a lower layer of electrically conductive plasticized polyvinyl chloride having a volume resistivity of $10^7$ to $10^{12}$ ohm-cm.

5. The article of claim 4, and a base fabric on the underside of said lower layer.

6. The article of claim 4, in which said lower level comprises expanded electrically conductive plasticized polyvinyl chloride.

7. The article of claim 4, in which said upper layer includes a conductive ingredient compounded therein.

8. The article of claim 4, in which said lower layer includes a conductive ingredient compounded therein.

* * * * *